United States Patent [19]

Gagliano et al.

[11] 4,286,902

[45] Sep. 1, 1981

[54] SELF-COLLETING DRILL

[75] Inventors: Robert L. Gagliano, Glendale; Herman G. Feuerstein, Hacienda Hts., both of Calif.

[73] Assignee: Dresser Industries, Inc., Dallas, Tex.

[21] Appl. No.: 110,579

[22] Filed: Jan. 9, 1980

[51] Int. Cl.³ .......... B23B 45/14

[52] U.S. Cl. .......... 408/79; 408/10; 408/51; 408/112

[58] Field of Search .......... 408/79, 10, 99, 112, 408/127, 46, 48, 51

[56] References Cited

U.S. PATENT DOCUMENTS

| | | | |
|---|---|---|---|
| 1,521,158 | 12/1924 | King | 408/79 |
| 2,706,918 | 4/1955 | Blatt | 408/51 |
| 2,909,949 | 10/1959 | Winslow | 408/10 |
| 2,963,927 | 12/1960 | Hanger | 408/79 |

FOREIGN PATENT DOCUMENTS

| | | | |
|---|---|---|---|
| 111339 | 7/1964 | Czechoslovakia | 408/112 |
| 197710 | 10/1977 | Fed. Rep. of Germany | 408/46 |

*Primary Examiner*—Leonidas Vlachos
*Attorney, Agent, or Firm*—Roy L. Van Winkle

[57] ABSTRACT

A self-colleting drill that includes a pair of parallel output shafts arranged to drive a pair of drill bits and means for retaining the work piece against a foot member of the drill so that the holes will be spaced therein in accordance with the spacing between the drill bits or shafts. A plurality of drill guide members having varying hole spacings therein, provide a variety of center distances between the shafts that extend therethrough. A plurality of foot members are also provided that have mating hole spacings to the drill bushings providing for the variable drill bit spacing.

5 Claims, 4 Drawing Figures

SELF-COLLETING DRILL

BACKGROUND OF THE INVENTION

This invention relates generally to improved drills. More particularly, but not by way of limitation, it relates to an improved, self-colleting drill that includes means for easily varying the spacing between the drill bits.

U.S. Pat. No. 2,909,949 issued Oct. 27, 1959 to J. C. Winslow, illustrates a self-colleting power drill that has parallel output shafts for driving two drill bits simultaneously at a particular spacing between the bits. The drill disclosed therein also includes a self-colleting apparatus to securely retain a work piece against the nose member of the drill during the drilling operation. The drill of this invention and the drill illustrated in the Winslow patent are very similar and provide the same function. However, it is not possible in the drill illustrated in the Winslow patent to vary the spacing between the drill bits.

The object of this invention is to provide an improved self-colleting drill having generally parallelly disposed output shafts for driving a pair of spaced drill bits wherein the drill bit spacing can be easily and quickly changed.

SUMMARY OF THE INVENTION

This invention provides an improved self-colleting drill that includes a hollow body, an air motor journaled in the body, a piston reciprocable in the body, a pair of rotatable drive shafts driven by the air motor, valve means in the body arranged to actuate the motor and piston, a foot member mounted on the body for engaging a work piece, the foot member being operably connected to the piston, and a collet carried by the foot member and actuatable by the piston to hold the work piece against the foot member. The improvement comprises a recess in the exterior of the body adjacent to one end of the drive shafts, a guide member located in the recess in the body and having a pair of spaced holes extending therethrough generally parallel to the direction of movement of the piston. A drill drive bushing rotatable in each of the holes and each of the bushings having one end connected to the drive shafts and arranged on the other end to receive a drill bit. Releasable means for removably locating the guide member on the body whereby the guide member can be quickly and easily exchanged to provide preselected spacings between the holes.

BRIEF DESCRIPTION OF THE DRAWING

The foregoing and additional objects and advantages of the invention will become more apparent when read in conjunction with the accompanying drawing wherein like reference characters denote like parts in all views and wherein.

DETAILED DESCRIPTION OF THE PREFERRED EMBODIMENT

Figure 1:
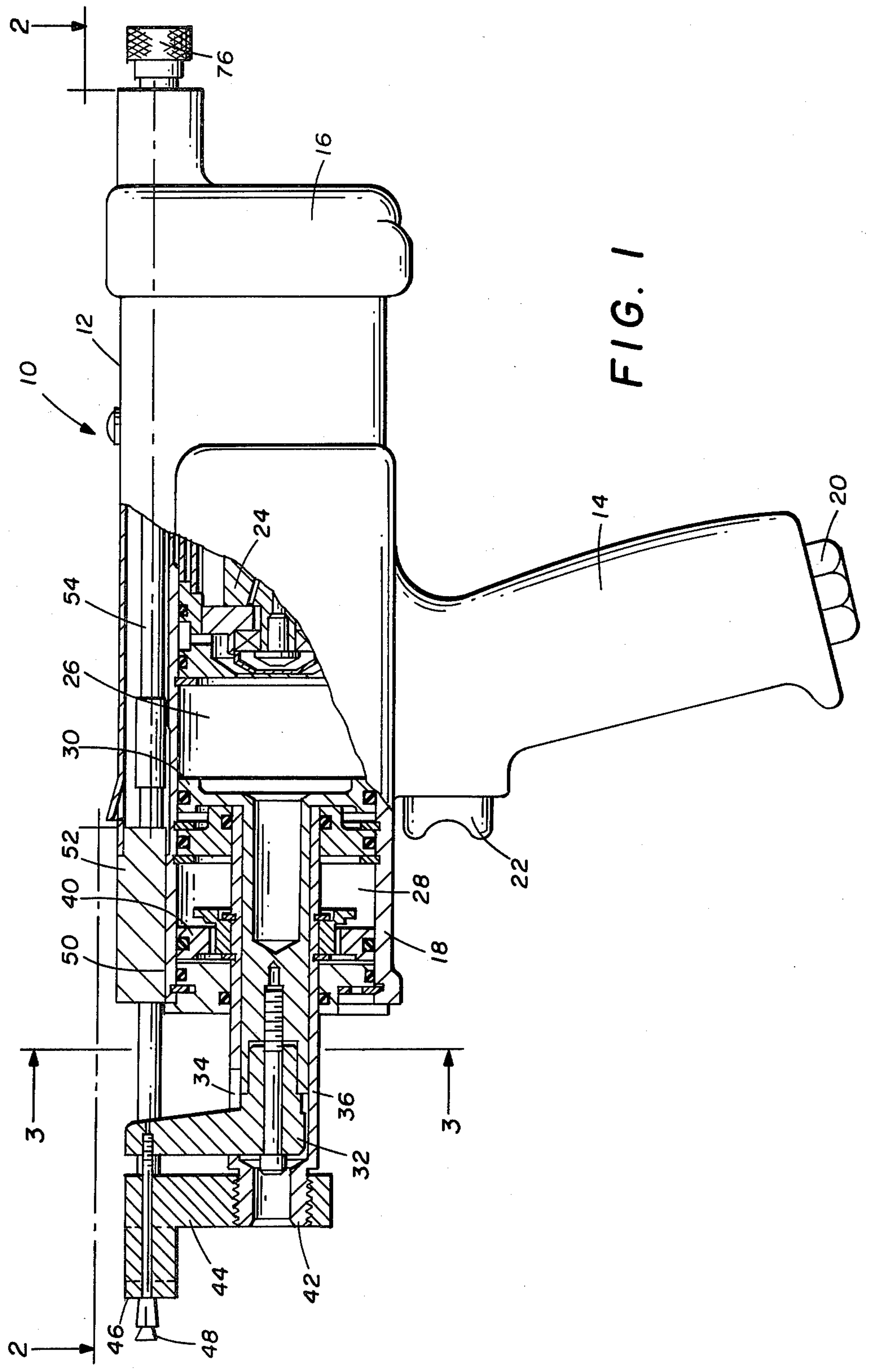
FIG. 1 is a side view, partially in elevation and partially in cross-section, of a drill constructed in accordance with the invention.
Figure 2:
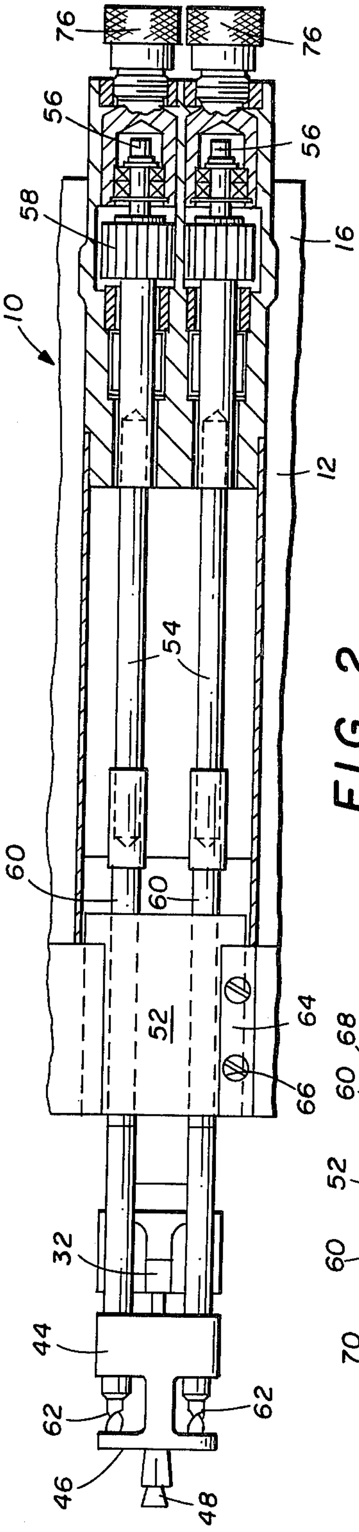
FIG. 2 is a top view, partially in cross-section and partially in elevation of the drill of FIG. 1 taken substantially along the line 2—2 of FIG. 1.

Referring to the drawing and to FIG. 1 in particular, shown therein and generally designated by the reference character 10, is a power drill constructed in accordance with the invention. The drill 10 includes a hollow body 12 having a handle portion 14 depending therefrom, a butt portion 16 and a nose portion 18.

The handle portion 14 includes a connection 20 for connecting the drill 10 with a source of air under pressure (not shown) and a trigger 22 that is interposed in an air supply conduit (not shown) between the connection 20 and an air motor 24 that is disposed within the hollow body 12.

Within the body 12 there is provided a rear cylinder 26 and a front cylinder 28. Slidably located in the rear cylinder 26 is a piston 30 that is connected to a collet actuating arm 32. The collect actuating arm 32 extends upwardly through a slot 34 formed in a tubular member or sleeve 36 that is connected to a front piston 40. The piston 40 is slidably disposed in the front cylinder 28. The sleeve 36 is connected at its exposed end 42 to a foot member 44.

The upper end of the foot member 44 terminates in a surface 46 that engages a work piece (not shown) upon which the drilling is to be performed. A split collect mechanism 48 extends through the upper end of the foot member 44 and is threadedly attached to the collet actuating arm 32.

The upper end of the body 12 has been partially removed adjacent to the nose portion 18 forming a cavity 50 in which a removable guide member 52 has been positioned. The guide member 52 will be discussed more fully hereinafter.

Also, within the upper portion of the body 12 is located a pair of generally parallelly disposed flexible drive shafts 54 that have their rearmost ends 56 journaled in bearings located in the housing 12. Also, near the rearmost ends 56 of the shafts 54, there is provided a gear 58 on each of the shafts that is in mesh with a gear train (not shown) located on the output shaft (not shown) of the air motor 24. The arrangement is such that rotation of the air motor 24 is transmitted to the gears 58 and the drive shafts 54.

The other ends of the drive shafts 54 are connected with a pair of drive bushings 60 that extend through and are journaled in the guide member 52. A pair of drill bits 62, of whatever configuration that may be desired, extend through holes provided in the foot member 44 into connection with the bushings 60 so that they are rotated by the drive shafts 54.

The guide member 52 is retained in the cavity 50 by a wedge-shape latch member 64 that is releasably secured to the body 12 by a pair of threaded fasteners 66.

Figure 4:
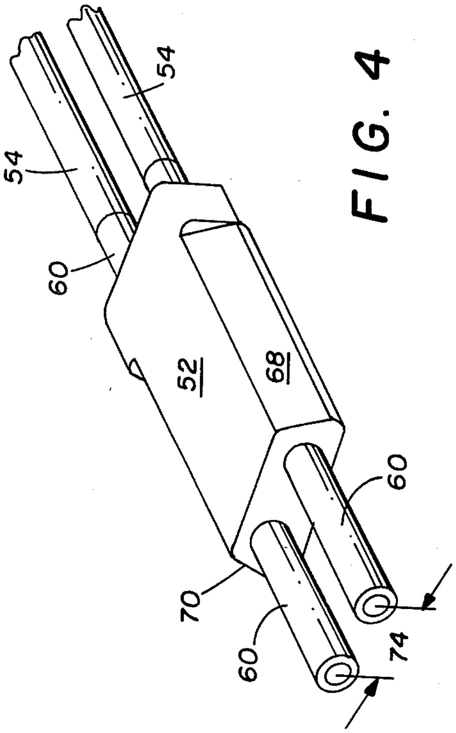
Figure 3:
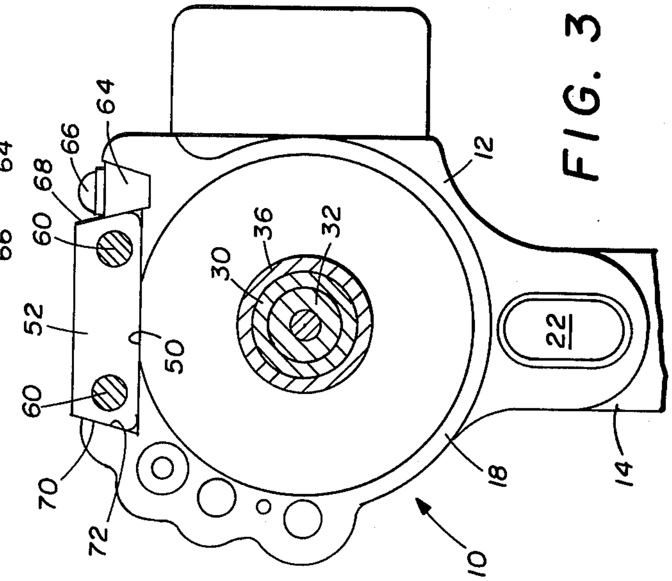
FIG. 3 is a front view of the drill taken generally along line 3—3 of the drill of FIG. 1; and, FIG. 4 is a pictorial view of a drill guide member removed from the drill.

It will be noted in FIGS. 3 and 4 that the guide member 52 is provided with tapered surfaces 68 and 70 that are arranged to mate with a tapered surface 72 in the cavity 50 and with one of the tapered sides of the latch member 64. Thus, the guide member 52 is securely retained in the body 12 but can be quickly and easily removed therefrom.

In FIG. 4, space 74 between the bushings 60 and the separation of the holes extending through the foot member 44 determines spacing of the holes that are drilled in the work piece by the drill bits 62. As mentioned before, the guide member 52 can be quickly and easily removed from the body 12 and the foot member 44 can also be removed rather easily from the sleeve 36 so that other members 44 and 52 can be provided that have a different spacing 74 between the bushings 60 and between the holes in foot member 44. Accordingly, the spacing of the holes drilled in the work piece can be selected to suit a particular requirement.

In the past, it has been necessary to provide a separate drill 10 for each hole spacing desired. Thus, it can be clearly seen that the drill 10 incorporating changeable guide members 52 and foot members 44, provides a much more versatile tool and one that will reduce the tool inventory since all that needs be maintained is a supply of foot members and guide members having the desired space 74.

If minor adjustments are needed in the position of the drill bit 62, they are accomplished by adjustment of the drill bit 62, they are accomplished by adjustment of the threaded knobs 76 which can independently adjust the position of the drill bits 62 through the drive shafts 54, and bushing 60 relative to the surface 46 on the foot member 44.

In the operation of the drill 10, the first step is to determine what spacing is desired between the holes to be drilled. When this is determined, the appropriate foot member 44 and guide member 52 are selected and positioned on the drill 10. The latch member 64 is removed by unscrewing the threaded fasteners 66 and the guide member 52 is placed in the cavity 50. The latch member 64 is then replaced so that the bushing is securely fastened in the cavity 50. Of course, the flexible drive shafts 54 are connected to the drive bushings 60 and after these are in place, the drill bits 62 are connected to the opposite ends of the bushings 60.

Upon depressing the trigger 22, the collet is expanded in a hole previously provided in the work piece so that the work piece is tightly retained against the surface 46 of the foot member 44. The collet 48 is expanded by air pressure which enters the rear cylinder 26 on the left hand side (as seen in FIG. 1) of the rear piston 30, driving the piston 30 to the right and moving the collet arm 32 to spread the collet 48 thus securing the work piece to the drill 10.

When this has been accomplished, air is introduced into the front cylinder 28 on the left side of the front piston 40 driving that piston and the connected sleeve 36 to the right pulling the foot member 44 relatively toward the nose portion 18 of the drill 10, so that the rotating drill bits 62 (which are held in a relatively fixed position), engage the work piece forming the holes to the desired depth.

Releasing the trigger 22 then permits the foot member 44 to move to the left as seen in FIG. 1, withdrawing the work piece from the drill bits 62 and eventually collapsing the collet 48 so that the work piece can be removed.

The structure of operation of the powered drill has been described in general terms because a detail description is contained in U.S. Pat. No. 2,909,949, previously mentioned. As will be apparent from the foregoing, this invention is an improvement to that drill.

Having described but a single embodiment of the invention, it will be apparent that it is presented by way of example only, and many changes and modifications can be made thereto without departing from the spirit of the invention.

The embodiments of the invention in which an exclusive property or privilege is claimed are defined as follows:

1. An improved self-colleting drill including a hollow body, an air motor journaled in the body, a piston reciprocable in the body, a pair of rotatable drive shafts driven by the air motor, valve means in said body arranged to actuate said motor and piston, a foot member mounted on the body for engaging and holding a work piece, the foot member being operably connected to the piston, and a collet carried by the foot member and actuatable by the piston to hold the work piece against the foot member, said improvement comprising:

said drive shafts are flexible a recess in the exterior of the body adjacent to one end of the drive shafts;

a guide member located in said recess on the body having a pair of spaced holes extending therethrough generally parallel to the direction of movement of the piston;

a drill drive bushing rotatable in each said hole, having one end connected to said drive shafts and arranged on the other end to receive a drill bit; and, releasable means for removably locating said guide member on the body whereby said guide member can be quickly and easily exchanged to provide preselected spacings between said holes.

2. In the drill of claim 1 wherein:

said guide member has a top and bottom surface and first and second sides extending generally parallel to said holes, said sides including portions tapering inwardly from said bottom surface toward said top surface; and, said recess has a tapered surface therein mating with one of said tapered portions.

3. In the drill of claim 2, said releasable means including a latch member releasably secured to said body and mating with the other of said tapered portions to releasably locate said guide member in said recess.

4. In the drill of claim 3 wherein:

said recess also has a second surface extending parallel to said tapered surface and located on the opposite side of said recess; and, said latch member has an upper surface, a lower surface, and said surfaces diverging from said lower surface toward said upper surface to mate with said other of said tapered portions on said guide member and with said second surface in said recess.

5. In the drill of claim 4 wherein said releasable means also includes at least one fastening member in engagement with said latch member and threadedly connected with the body.

* * * * *